United States Patent [19]

Siems et al.

[11] 3,859,573

[45] Jan. 7, 1975

[54] SIMULTANEOUS MULTI-CORE DEMAGNETIZATION

[75] Inventors: Lee E. Siems; Ben B. Thigpen; Charles C. Harman, all of Houston, Tex.

[73] Assignee: Digital Data Systems, Inc., Houston, Tex.

[22] Filed: Oct. 1, 1973

[21] Appl. No.: 402,639

[52] U.S. Cl. .............................................. 317/157.5
[51] Int. Cl. .............................................. H01f 13/00
[58] Field of Search ................................. 317/157.5

[56] References Cited
UNITED STATES PATENTS

| | | | |
|---|---|---|---|
| 2,959,722 | 11/1960 | Gilinson, Jr. | 317/157.5 |
| 3,482,163 | 12/1969 | Peek et al. | 317/157.5 |

Primary Examiner—L. T. Hix
Attorney, Agent, or Firm—Michael P. Breston

[57] ABSTRACT

This invention relates to demagnetizing the cores of a plurality of input transformers, each transformer having a primary winding and a secondary winding connected to a load subject to becoming non-linear. The load has a linear operating mode when the amplitude of a sinusoidal signal applied to the primary winding is below a critical value and a non-linear operating mode when the amplitude of the applied AC signal exceeds this critical value. The demagnetization is achieved by "wiping" each transformer core with a decaying AC signal having an initial amplitude up to the critical value and a frequency corresponding to the initial amplitude which is sufficient to saturate each core.

4 Claims, 2 Drawing Figures

$I_1$ = Primary current
$I_2$ = Secondary load current
$R_1$ = Resistance of primary
$R_2$ =      "      "   secondary
$R_3$ = Secondary load $X_1$ = Primary leakage reactance
$X_2$ = Secondary   "        "
$g$  = Conductance of exciting circuit
$b$  = Susceptance of exciting circuit

SIMULTANEOUS MULTI-CORE DEMAGNETIZATION

BACKGROUND OF THE INVENTION

In multi-channel systems, such as for example in seismic recording systems, a small input transformer is connected in each channel between the incoming seismic signals and a pre-amplifier, typically of the semiconductor type. To obtain a high inductance with a small transformer, the core laminations are made from high-mu metal. Input transformers for seismic systems are susceptible to magnetization by the nature of the environment in which these systems operate. A DC component introduced into the input of the transformer will partially or fully magnetize the core of the transformer. By virtue of the high permeability of these cores, modern seismic transformers will exhibit magnetostrictive properties when magnetized. The magnetized transformers will then act as seismic transducers, when subjected to mechanical vibrations, thereby producing undesired noise into the seismic systems.

In accordance with prior practice, residual core magnetization is removed by subjecting the core to a slowly-diminishing, alternating magnetic field produced by an alternating voltage applied to the transformer's primary winding. The effective peak-to-peak value of the positive and negative voltage swings must be sufficient to saturate the core. Desirably, following initial application, the voltage should be allowed to slowly decay to zero, whereupon all residual magnetization should become erased. This decaying alternating voltage is known as a "wiping signal."

In practice, the wiping signal will be effective only if the core's resulting hysteresis loop collapses symmetrically to zero.

We have discovered that an operational pre-amplifier, when connected across the secondary winding of the transformer, will operate in a non-linear mode unless the characteristics of the wiping signal are carefully selected. When the wiping signal drives the pre-amplifier into its non-linear mode, the magnetization curve of the input-transformer core exhibits an unsymmetrical hysteresis loop and, hence, unless properly selected as to amplitude and frequency, the wiping signal will be ineffective to demagnetize the core. Accordingly, in prior art practice, it was felt necessary to disconnect each transformer (or at least its secondary winding) from its load prior to the application of a wiping signal thereto.

In multi-channel seismic recording systems, up to 96 separate input transformers may be employed. To disconnect all of the secondary windings from their associated pre-amplifiers requires a considerable amount of time and there is even risk of damage to the equipment.

Accordingly, there is a need for an effective method and apparatus for demagnetizing the cores of input transformers without having to disconnect the transformers from their pre-amplifiers.

SUMMARY OF THE INVENTION

In accordance with this invention the cores of the input transformers are properly demagnetized while the secondary windings thereof are connected to their loads. Applied to the primary windings of the transformers is a wiping signal whose amplitude is equal to or slightly less than a critical value so that the connected loads will operate within their linear modes. The wiping signal's frequency corresponding to the selected amplitude will have a value which will cause the wiping signal to saturate the cores.

BRIEF DESCRIPTION OF THE DRAWINGS

Figure 1:
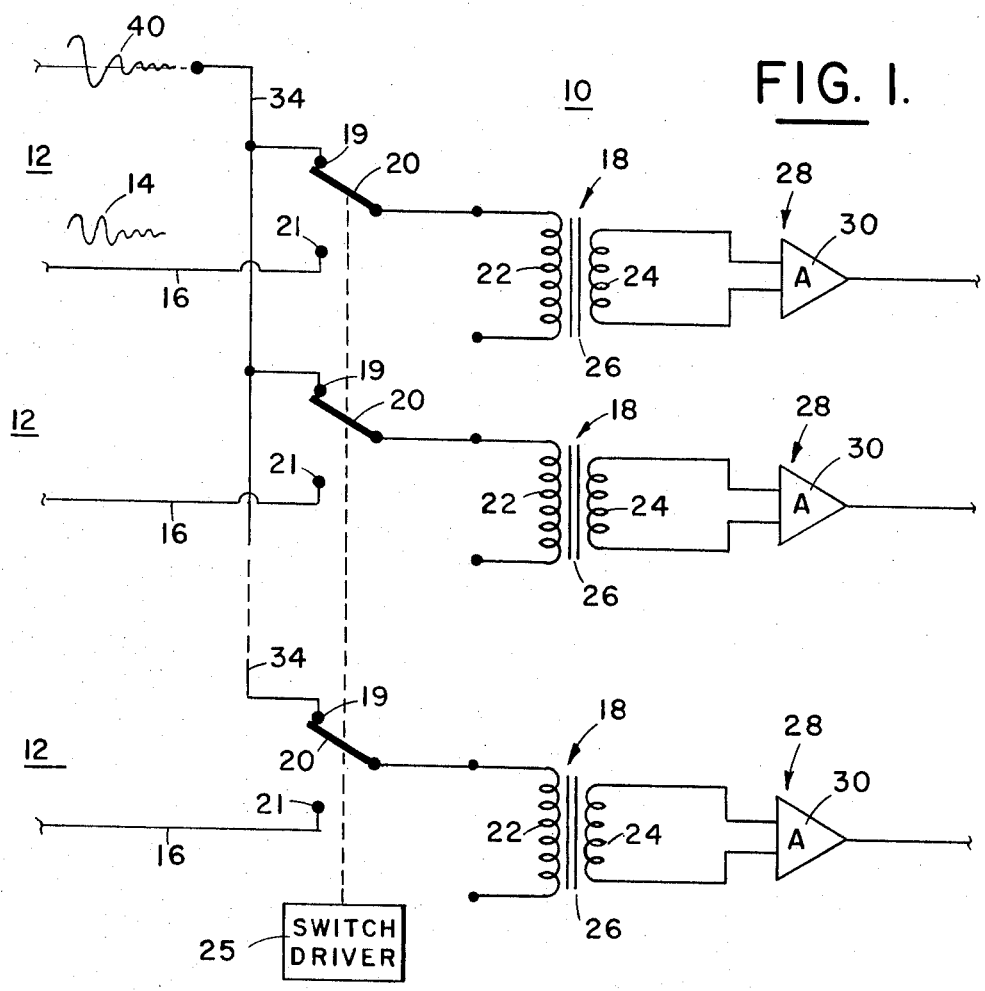
FIG. 1 is a schematic representation of a portion of a multi-channel seismic recording system employing this invention.

A multi-channel system, which could be a multi-channel seismic recording system, generally designated as 10, includes a plurality of channels 12. Each channel 12 receives an input seismic signal 14 on an input line 16 connected to a transformer, generally designated as 18, through a terminal 21 of a switch 20.

The transformer has a primary winding 22, a secondary winding 24 and a core 26. Connected to the secondary winding is a load, generally designated as 28, which in the seismic recording system is an operational pre-amplifier 30. Amplifier 30 has a linear operating mode and a non-linear operating mode. So long as the amplitude of the AC signal $E_i$ applied to the input of the primary winding of the input transformer does not exceed a critical value $E_c$, the amplifier will operate in its linear mode. The critical value of the signal's voltage amplitude can be experimentally determined, or it can be computed from the gain of the amplifier and the turnsratio of the transformer. When the signal's amplitude applied to the primary winding 22 exceeds this critical value, the operational amplifier 30 will operate in its non-linear mode, that is, the input to the operational amplifier and the output therefrom will not be related by a linear function.

In one embodiment of this invention, an amplifier output voltage exceeding 10 volts peak-to-peak drove the amplifier into a non-linear operating mode. With a typical overall gain of ×128 (including transformer and amplifier), the critical value of the wiping voltage $E_c$ applied to the primary was $0.707 (10/128) = 55.2$ millivolts.

The critical value of the voltage $E_c$ applied to the primary winding can also be computed from:

$$E_c = E_{oc} N_1 / G N_2,$$

where
$E_{oc}$ = amplifier's output critical voltage;
$N_1$ = primary turns;
$N_2$ = secondary turns;
$G$ = amplifier gain.

If the amplifier's linear operating range is exceeded, the amplifier will saturate. In the saturation or non-linear region of operation the amplifier presents a low impedance to the transformer's secondary winding.

Therefore, as used in the specification and claims, the expression "critical value" defines the amplitude of the voltage of an AC signal applied to the primary winding which will cause the amplifier to change from its linear to its non-linear operating mode.

Figure 2:
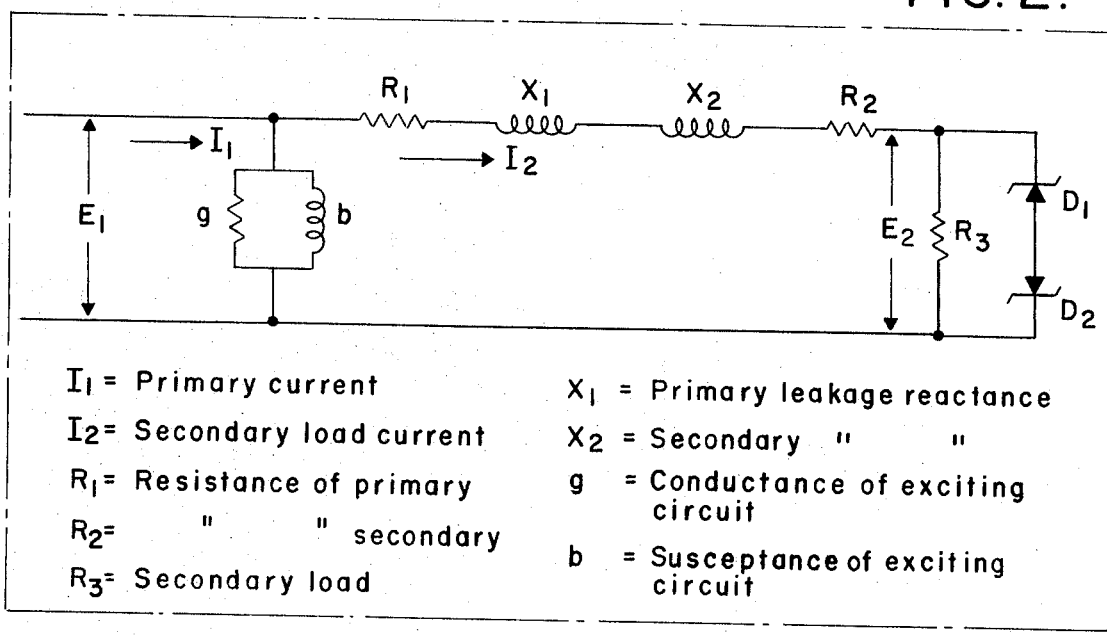
FIG. 2 is an equivalent circuit useful in explaining the operation of the circuit in FIG. 1.

FIG. 2 illustrates the equivalent circuit of a transformer 18 and an amplifier 30. In its linear operating region, amplifier 30 presents a very high-resistance load $R_3$ to secondary winding 24. In its non-linear operating mode, the amplifier can be represented by a pair of Zener diodes $D_1$ and $D_2$ which become conducting when the voltage thereacross equals $E_{oc}$ thereby shorting out resistor $R_3$ and presenting a low impedance to the transformer's secondary 24. In the non-linear mode, with a low impedance across the secondary, the primary's resistance $R_1$ will limit the current to the primary winding 22 such that the core cannot become saturated.

In accordance with this invention, a wiping signal 40 is applied, preferably simultaneously, to each primary winding 22 by a line 34 through another terminal 19 of switch 20. The switches 20 can be operated simultaneously by a switch driver 25. The maximum initial amplitude of the voltage of wiping signal 40 is made equal to or slightly less than the critical value $E_c$. The corresponding required frequency f of the applied wiping signal 40 can be experimentally determined or can be computed as follows:

$$f = E_c / 4.44 \, N_1 \phi$$

where
$E_c$ = critical value;
$N_1$ = number of primary turns;
$\phi = 6.452 \, BA \times 10^{-8}$,
where
$B$ = magnetic flux in gauss,
$A$ = core area in square inches.

For further description, reference can be had to "Alternating Current Fundamentals" by Arthur P. Dillow, Page 286, Bobbs-Merrill Co., New York. The last equation is only valid for a substantially open-circuit secondary.

In one embodiment, the transformer's characteristics were as follows:
$A = 0.125$ in$^2$
$N_1 = 2900$ turns
$B = 20,000$ gauss
$E_c = 0.0552$ volts From Equation 2, the required maximum frequency f was found to be 0.026Hz.

What is claimed is:

1. In a method for demagnetizing the cores of a plurality of input transformers, each transformer having a core, a primary winding and secondary winding connected to a load, the load having a linear operating mode when the amplitude of an AC signal applied to the primary winding of the load's input transformer is below a critical value, and the load having a non-linear operating mode when the amplitude of the applied AC signal exceeds said critical value, the improvement comprising:

wiping each core with a decaying AC signal having an initial amplitude up to said critical value and a frequency corresponding to said critical value, the value of said frequency being selected to saturate each core.

2. The method of claim 2 wherein the cores of said plurality of transformers are wiped simultaneously.

3. The method of claim 3 wherein said load is a preamplifier.

4. A method for demagnetizing an input transformer having a core, a primary winding and a secondary winding connected to a load, the load having a linear operating mode when the amplitude of an AC signal applied to the primary winding of the load's input transformer is below a critical value, and the load having a non-linear operating mode when the amplitude of the applied AC signal exceeds said critical value, the improvement comprising:

wiping said core with a decaying AC signal having an initial amplitude up to said critical value and a frequency corresponding to said critical value, the value of said frequency being selected to saturate each core.

* * * * *